United States Patent
Xie et al.

(10) Patent No.: US 9,185,652 B2
(45) Date of Patent: Nov. 10, 2015

(54) BLUETOOTH LOW ENERGY MODULE SYSTEMS AND METHODS

(75) Inventors: Guoxin Xie, San Diego, CA (US); Yuan Zhuang, San Diego, CA (US); Angel Polo, San Diego, CA (US); Chikan Kwan, San Diego, CA (US); Cindy (Xin) Tian, San Diego, CA (US); Arthur Jin, San Diego, CA (US); Long Wang, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 201 days.

(21) Appl. No.: 13/334,205

(22) Filed: Dec. 22, 2011

(65) Prior Publication Data

US 2013/0165044 A1    Jun. 27, 2013

(51) Int. Cl.
*H04W 52/02* (2009.01)
*H04W 8/00* (2009.01)
*H04L 12/18* (2006.01)

(52) U.S. Cl.
CPC ......... *H04W 52/0229* (2013.01); *H04L 12/189* (2013.01); *H04W 8/005* (2013.01)

(58) Field of Classification Search
CPC . H04W 52/0229; H04W 52/02; H04W 28/00; H04W 72/00
USPC ............... 455/41.1, 41.2, 418, 419; 358/1.15
See application file for complete search history.

(56) References Cited

U.S. PATENT DOCUMENTS

| | | | | |
|---|---|---|---|---|
| 2004/0250061 | A1* | 12/2004 | Yamauchi et al. | 713/155 |
| 2006/0072151 | A1* | 4/2006 | Amani et al. | 358/1.15 |
| 2007/0202865 | A1* | 8/2007 | Moride | 455/419 |
| 2010/0302979 | A1* | 12/2010 | Reunamaki | 370/311 |
| 2011/0319020 | A1* | 12/2011 | Desai et al. | 455/41.2 |
| 2012/0196534 | A1* | 8/2012 | Kasslin et al. | 455/41.2 |
| 2012/0309312 | A1* | 12/2012 | Sim et al. | 455/41.1 |
| 2013/0017816 | A1* | 1/2013 | Talty et al. | 455/418 |
| 2013/0090061 | A1* | 4/2013 | Linde | 455/41.2 |

* cited by examiner

*Primary Examiner* — Wesley Kim
*Assistant Examiner* — Raj Chakraborty
(74) *Attorney, Agent, or Firm* — McDermott Will & Emery LLP (57) ABSTRACT

Disclosed are various embodiments of Bluetooth low energy (BLE) modules and methods implemented therein. An embodiment of the disclosure can obtain in a BLE module an advertiser packet transmitted by a BLE advertiser. An advertiser cache can be checked to determine whether the advertiser cache in the BLE module contains an entry associated with an advertiser address from the advertiser packet. The BLE module can determine whether a payload value of the advertiser packet has changed relative to a previous advertiser packet associated with the advertiser address. The BLE module can then suppress forwarding of the packet to a host processor and/or on-board processor executing firmware. The BLE module can also suppress sending a scan request packet back to the BLE advertiser.

20 Claims, 6 Drawing Sheets

BLUETOOTH LOW ENERGY MODULE SYSTEMS AND METHODS

BACKGROUND

The Bluetooth low energy (BLE) is a specification that enables radio frequency communication between various types of devices. One particular portion of the BLE standard is the advertiser/scanner model that allows a device designated as an advertiser device to broadcast information that can be received by one or more scanner devices. Bluetooth modules implementing the BLE standard are often integrated into various types of mobile devices that are battery powered. Accordingly, managing power consumption associated with Bluetooth modules is a concern as it pertains to battery life concerns in mobile devices, including smartphones, laptop computers, tablet computing systems, and other devices.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Embodiments of the present disclosure are related to systems and methods for reducing power consumption in a Bluetooth low energy (BLE) module. More specifically, embodiments of the disclosure can reduce power consumption of a BLE module when the BLE module is acting as a scanner to receive advertiser packets in an advertising channel in a Bluetooth environment. In advertising channels, a device incorporating a BLE module may operate as an advertiser, a scanner, or an initiator. Embodiments of the present disclosure can help reduce power consumption of a device acting as a scanner as well as an advertiser.

Figure 1:
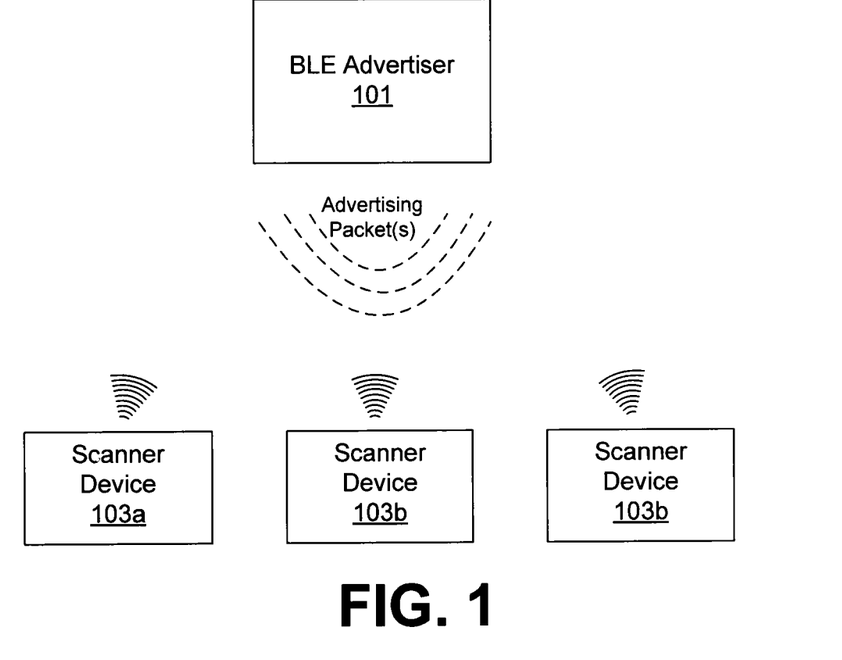
FIG. 1 is a drawing of a BLE communication environment including at least one BLE advertiser and at least one scanner device according to an embodiment of the disclosure.

Reference is made to FIG. 1, which illustrates a BLE communication environment in which a BLE advertiser 101 can broadcast advertising packets that can be obtained by scanner devices 103 comprising a BLE module within communication range of the BLE advertiser 101. A BLE advertiser 101 can comprise any device acting in an advertiser role according to the BLE standard. For example, a BLE advertiser 101 can comprise a device with temperature sensors that broadcasts temperature data that can be received and read by scanner devices 103 within communication range. As another example, the BLE advertiser 101 can comprise a device that broadcasts product or promotional information to scanners devices 103 in a retail establishment. In this sense, a BLE advertiser 101 may comprise any suitable logic, circuitry and/or code that may be enabled to broadcast advertisements periodically in BLE advertising channels.

The scanner devices 103 may comprise any suitable logic, circuitry and/or code that may be operable to search for advertising packets from BLE advertisers 101 within communication range. A scanner device 103 may be configured to perform a passive scan or an active scan. In a passive scan, the scanner device 103 may be enabled to listen for advertising packets and may not transmit messages to advertisers. In an active scan, the scanner device 103 may request an advertiser to transmit additional information that may not be available in the received advertising packets. A scanner device 103 can comprise any processor based system, such as a computing device, laptop computer, mobile device, smartphone, tablet computing system, or any other device in which a BLE module is integrated or connected. A scanner device 103 can also be thought of as a host device in which a BLE module is integrated, where the host device includes a host processor, memory, and other computing resources and that employs a BLE module to facilitate communication with other devices in a BLE communication environment. In such a scenario, the host processor may execute an application that utilizes communication via the BLE module and hence transmits and/or receives data via the BLE module.

Figure 2:
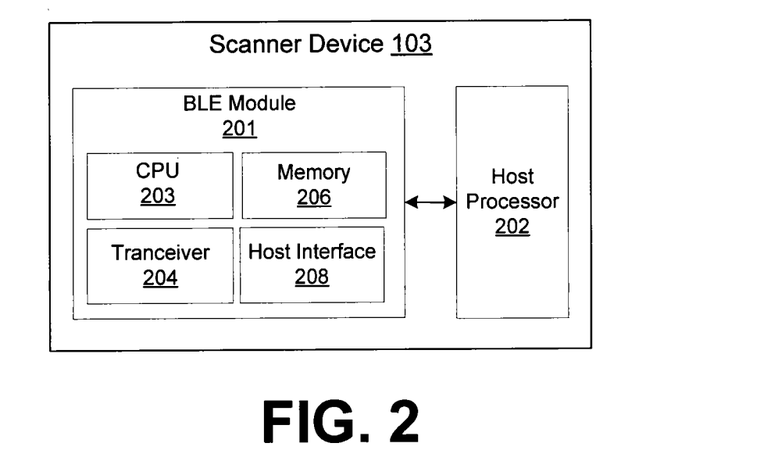
FIG. 2 is a drawing of a scanner device from the BLE communication environment shown in FIG. 1 that incorporates a BLE module according to an embodiment of the disclosure.

FIG. 2 is a block diagram illustrating one example of a scanner device 103 according to an embodiment of the disclosure. The scanner device includes a BLE module 201 that can be in communication with a host processor 202. The BLE module 201 comprises a central processing unit (CPU) 203, a transceiver 204, memory 206 and a host interface 208 that facilitates communication between the BLE module 201 and the host processor 202. The BLE module 201 can be any suitable logic, circuitry, interfaces and/or code that facilitates transmission and/or receiving of signals over BLE air interface. In one embodiment, the received signals may comprise advertising packets received over advertising channels from BLE advertiser.

The CPU 203 can execute firmware associated with operation of the BLE module 201 for managing and/or providing support for link management functionality for the BLE module 201. Firmware executed by the CPU can also facilitate communication with the host processor 202 via the host interface 208. It should be appreciated that the BLE module 201 need not have an on-board CPU 203 and that many embodiments may comprise a transceiver 204 that receives data from and forwards data to the host processor 202. The transceiver 204 can comprise suitable logic and/or circuitry to facilitate transmission and/or receiving of wireless signals exchanged with other BLE devices. The BLE module 201 also includes on-board memory 206 that the CPU 203 and/or transceiver 204 can utilize for various operations such as those described herein. The host interface 208 can facilitate communication with other components in the scanner device 103, such as, but not limited to, the host processor 202, input devices, memory and any other computing resources in the scanner device 103. The host interface 208 can communicate with the scanner device 103 via a physical transport such as universal asynchronous receiver/transmitter (UART), serial peripheral interface bus (SPI), universal serial bus (USB) interface, peripheral component interconnect (PCI), or any other device interface as can be appreciated.

Figure 3:
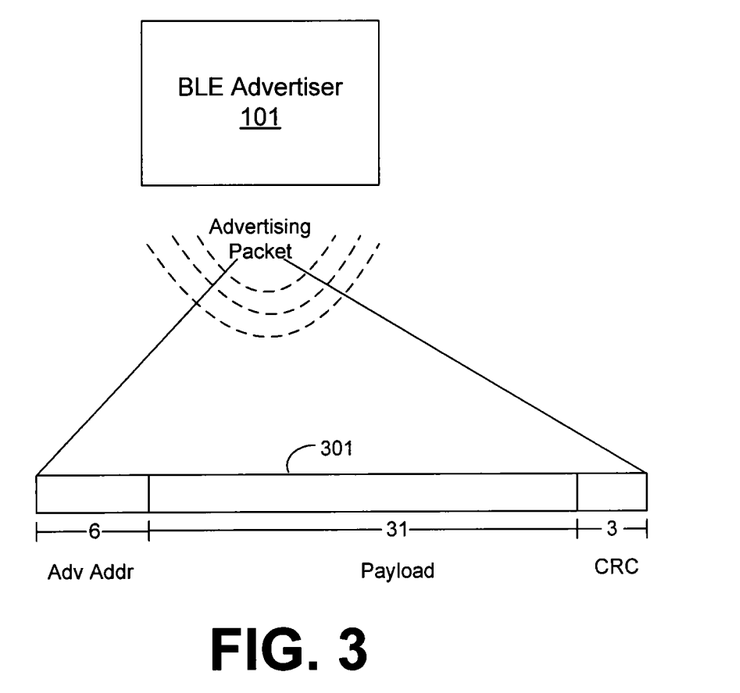
FIG. 3 is a drawing of one example of an advertising packet format that can be sent by a BLE advertiser from the BLE communication environment of FIG. 1 according to an embodiment of the disclosure.

Reference is now made to FIG. 3, which illustrates an exemplary structure of relevant fields in an advertising packet 301 that can be broadcast by a BLE advertiser 101 and received by a scanner device 103 according to various embodiments of the disclosure. It should be appreciated that the depicted advertising packet 301 is but one example of fields in such a packet that are relevant to embodiments of the disclosure and that other fields in a packet may exist or can be provided by a BLE advertiser 101. Additionally, the depicted byte lengths of the various fields can also vary in different implementations of the disclosure, and the depicted byte lengths are but one example In the depicted example, the advertising packet 301 contains a six byte advertiser address field, a thirty-one byte payload field, and a three byte error checking field. The error checking field can be generated by the BLE advertiser 101 so that a scanner device 103 can verify the integrity of an advertising packet 301 that is received in a BLE module 201 associated with the scanner device 103. In the depicted embodiment, the error checking field is a cyclic redundancy check (CRC) field that is generated based upon the contents of one or more of the payload and advertising address.

The advertising address comprises a unique identifier associated with the BLE advertiser 101. The advertising address can comprise a device identifier such as a media access control address (MAC address) or other unique or semi-unique identifier with which the specific BLE advertiser 101 can be identified. The payload comprises the data content broadcasted by the BLE advertiser 101. The payload can be structured according to requirements set forth in various standards, such as, but not limited to, the BLE standard. In some embodiments, the payload can identify a service type associated with the BLE advertiser 101 so that a scanner device 103 can determine the type of data contained in the payload (e.g., temperature data, promotional information, location information, etc.). The payload can also contain one or more fields that specify a bitwise structure of the payload field so that a host application executed in a scanner device 103 can properly extract data from the payload for use by the application.

Figure 4:
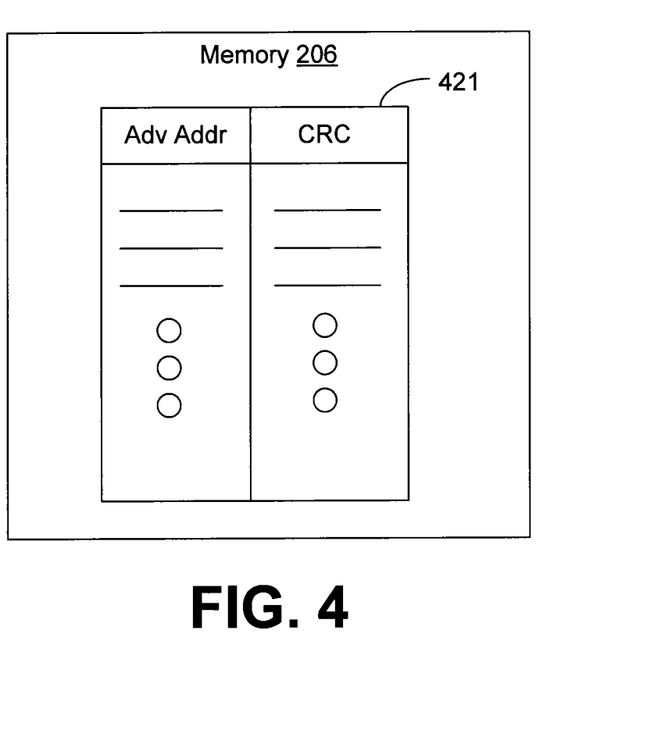
FIG. 4 is a drawing of an advertiser cache that can be maintained in the memory of a BLE module from the BLE communication environment of FIG. 1 according to an embodiment of the disclosure.

Accordingly, embodiments of the present disclosure can operate to reduce power consumption of a BLE module by caching certain data received in an advertising packet 301. The BLE module 201 can maintain an advertiser cache 421 that caches an advertiser address as well as an error checking field that can be extracted from an advertising packet 301 by the BLE module 201. In some embodiments, the transceiver 204 can receive an advertising packet 301 from a BLE advertiser 101, and the transceiver 204 and/or firmware executed by the CPU 203 can cache the error checking or CRC field as well as the advertiser address associated with the packet in the advertiser cache 421. In some embodiments, the transceiver 204 can receive an advertising packet 301 can forward the packet to firmware executed by the CPU 203. In other words, the transceiver 204 can wake the on-board CPU 203 so that the firmware can determine an appropriate action to take. In some embodiments, the firmware executed by the CPU 203 can forward the advertising packet 301 to an application executed by the host processor 202.

Upon receiving subsequent packets from the same BLE advertiser 101 (i.e., subsequent advertiser packets having the same advertiser address), the transceiver 204 and/or CPU 203 can determine whether the payload of the packet has changed relative to an earlier received advertising packet 301 from the same BLE advertiser 101. In some embodiments, the transceiver 204 can perform this step by searching the advertiser cache 421 and attempting to locate an entry in the cache that is associated with the advertiser address. If an entry associated with the advertiser address is located, the transceiver 204 can then determine whether the CRC field in the advertising packet 301 differs from the CRC field cached in the advertiser cache 421. If there is no change in the payload of the advertising packet 301 relative to the most recently received packet from the BLE advertiser 101, then the cached error checking or CRC field will be the same as the one extracted from the packet.

In this scenario, the transceiver 204 can take one or more steps that operate to reduce power consumption of the BLE module 201. The transceiver 204 can suppress or forego issuing a scan request packet that is transmitted back to the BLE advertiser 101 because if the payload is unchanged, the BLE module 201 can assume that there is no change in data received from the BLE advertiser 101. This can serve to reduce power consumption by eliminating the power consumption associated with transmitting the scan request packet to the BLE advertiser 101 as well as the power consumption associated with receiving a subsequent scan response back from the BLE advertiser 101.

The transceiver 204 can also suppress or forego forwarding the advertising packet 301 to the firmware executed by the CPU 203. In this scenario, the CPU 203 can be put into a sleep or low power mode and can avoid being awoken by the transceiver 204 in order to process a duplicative advertising packet 301. Additionally, the BLE module 201 avoids forwarding the advertising packet 301 to the host processor 202, which can allow the host processor 202 to be placed in a sleep or low power mode and avoid being awoken by the BLE module 201 to process the duplicative packet.

In some embodiments, the transceiver 204 can forward a received advertising packet 301 to firmware executed by the CPU 203, which can cache an advertiser address and/or error checking field associated with an advertising packet 301 as well as make the determination to suppress issuing a scan request packet back to the BLE advertiser 101. The firmware executed by the CPU can also make the determination to suppress or forego forwarding a duplicative advertising packet 301 to a host application executed by the host processor 202 in the scanner device 103.

Figure 5:
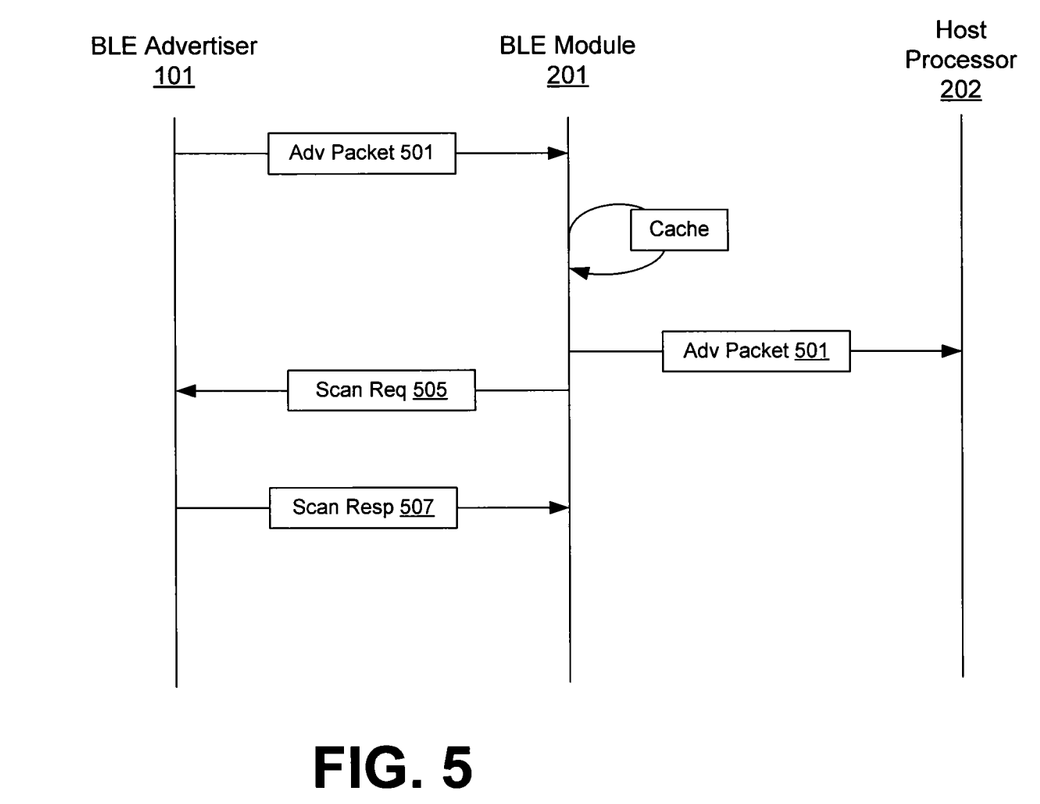
FIGS. 5-6 show one example of data flow between a BLE advertiser as well as a BLE module and host processor of a scanner device from the BLE communication environment of FIG. 1 according to an embodiment of the disclosure.

Reference is now made to FIG. 5, which illustrates the flow of data between a BLE advertiser 101 as well as a BLE module 201 and host processor 202 of a scanner device 103 according to one embodiment of the disclosure. As shown in FIG. 5, the BLE module 201 of a scanner device 103 can receive an advertising packet 501 from the BLE advertiser 101. In the case of an advertising packet 501 that has changed relative to a most recently received advertising packet 501 or a first advertising packet 501 received from a particular BLE advertiser 101, the BLE module 201 can cache the advertiser address and error checking field. In this scenario, the BLE module 201 can also forward the advertising packet 501 to the host processor 202 or a host application executed by the host processor 202. The BLE module 201 can also issue a scan request 505 packet to the BLE advertiser 101, which can respond with a scan response 507 packet.

Figure 6:
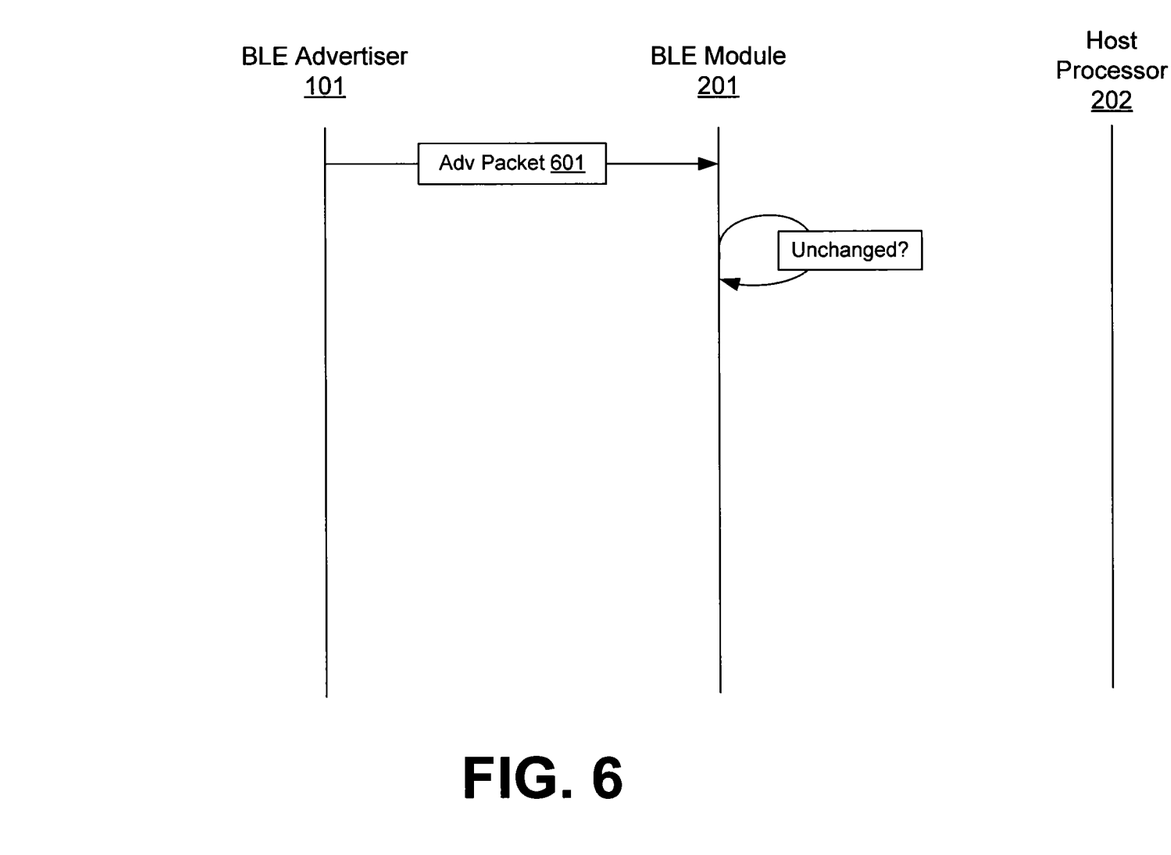

Continuing the example of FIG. 5, reference is now made to FIG. 6, which illustrates application of an embodiment of the disclosure. In the example of FIG. 6, the BLE module 201 receives an advertising packet 601 for which the advertiser cache 421 (FIG. 4) in the BLE module 201 contains an entry. The BLE module 201, whether by the transceiver 204 or the CPU 203, can determine whether the error checking field (e.g. CRC field) of the received advertising packet 601 matches the entry in the advertiser cache 421 associated with the advertiser address. If so, the BLE module 201 can suppress issuing a scan request packet as well as suppress forwarding the advertising packet 601 to the host processor 202. This can cause the BLE module 201 to consume less power than if a scan request packet is issued and/or the host processor 202 is awoken or caused to process the duplicative advertising packet 601.

Figure 7:
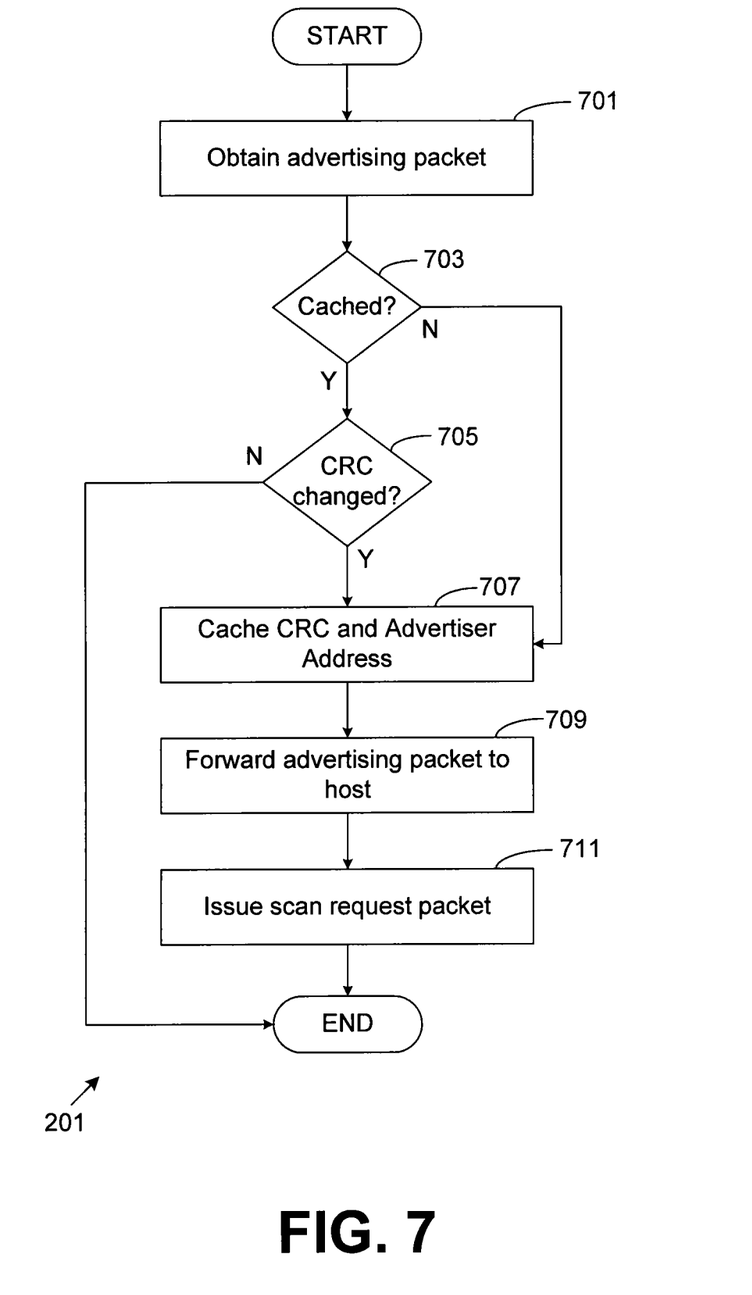
FIG. 7 is a flowchart that provides one example of logic executed in the BLE module of FIG. 2 according to various embodiments of the present disclosure.

Referring next to FIG. 7, shown is a flowchart that provides one example of the operation of a portion of the BLE module 201 according to various embodiments. It is understood that the flowchart of FIG. 7 provides merely an example of the many different types of functional arrangements that may be employed to implement the operation of the portion of logic executed in the BLE module 201 as described herein. As an alternative, the flowchart of FIG. 7 may be viewed as depicting an example of steps of a method implemented in the BLE module 201 according to one or more embodiments. The process depicted in FIG. 7 can be implemented in the transceiver 204, the CPU 203 and/or any combination thereof.

First, in step 701, the BLE module 201 can obtain an advertising packet 301 from a BLE advertiser 101. As noted above, an advertising packet according the BLE standard comprises at least an advertiser address, a payload, and an error checking field that is often a CRC checksum value that allows a recipient of the packet to validate the payload of the packet. In step 703, the BLE module 201 can determine whether the advertiser cache 421 contains an entry associated with the advertiser address of the received advertising packet 301. If not, then the BLE module 201 can cache the advertiser address along with the error checking field in an advertiser cache 421 associated with the BLE module 201 in step 707. If so, then the process can proceed to step 705.

In step 705, the BLE module 201 can determine whether the error checking field, or the CRC value, from the received advertising packet has changed relative to the cached CRC value from the advertiser cache 421 associated with the advertiser address. If the CRC value has not changed, then the process can end. In other words, the BLE module 201 can suppress the sending of a scan request packet back to the BLE advertiser 101 as well as suppress forwarding of the advertising packet to a host processor and/or host application, thereby reducing or eliminating the power consumption ramifications that are potentially associated with these actions.

If the CRC value has changed, the BLE module 201 can determine that the payload of the advertising packet has changed and cache an updated CRC value in the advertiser cache 421. Additionally, the BLE module 201 can forward the advertising packet and/or payload of the packet to a host application and/or host processor. The BLE module 201 can also issue a scan request packet to the BLE advertiser 101, which can result in the BLE advertiser 101 issuing a scan response packet back to the BLE module 201.

Figure 8:
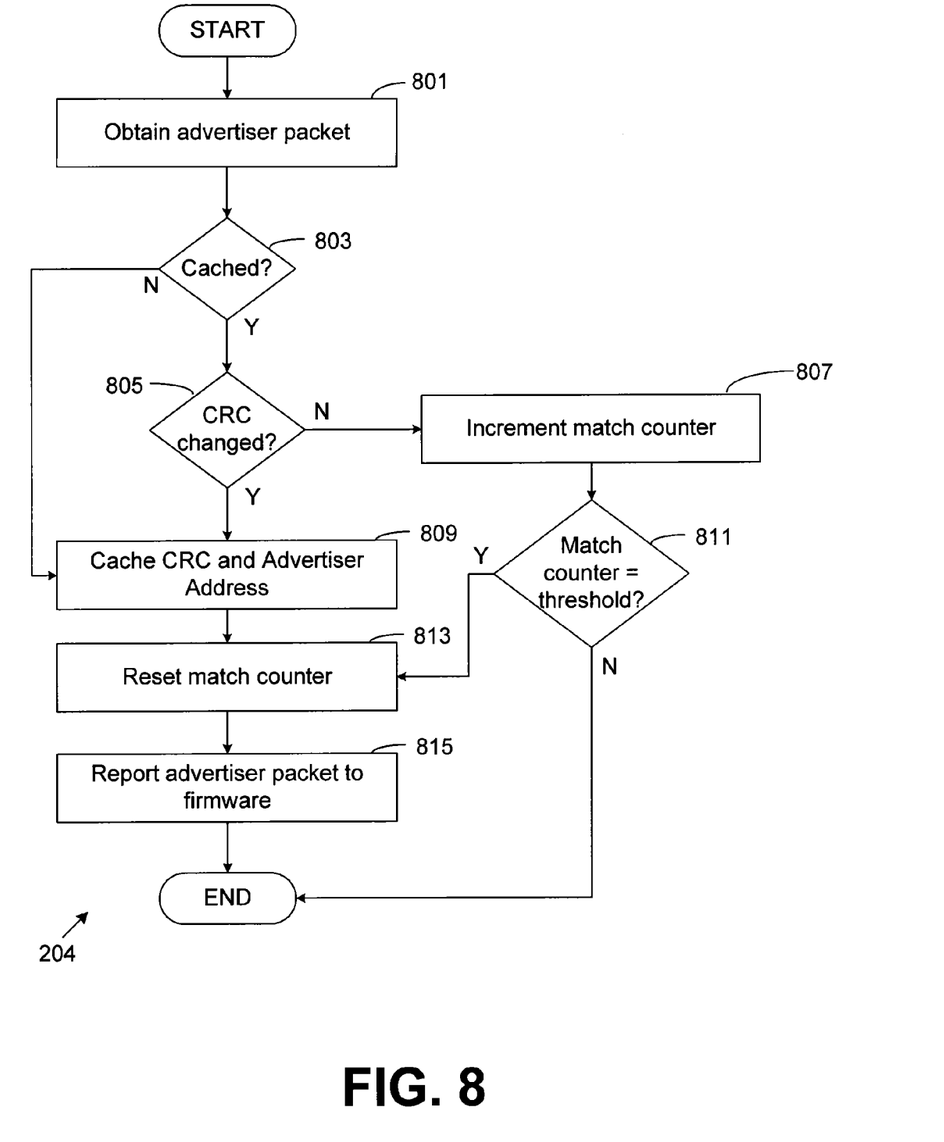
FIG. 8 is a flowchart that provides one example of logic executed in the transceiver of the BLE module of FIG. 2 according to various embodiments of the present disclosure.

Referring next to FIG. 8, shown is a flowchart that provides one example of the operation of a portion of the transceiver 204 according to various embodiments. It is understood that the flowchart of FIG. 8 provides merely an example of the many different types of functional arrangements that may be employed to implement the operation of the portion of logic executed in the transceiver 204 of the BLE module 201 as described herein. As an alternative, the flowchart of FIG. 8 may be viewed as depicting an example of steps of a method implemented in the transceiver 204 according to one or more embodiments. The process depicted in FIG. 8 is an alternative implementation of a way in which the BLE module 201 can be configured to reduce power consumption associated with receiving advertiser packets. The process of FIG. 8 is one way in which advertiser packets can be cached without intervention of firmware executed by the on-board CPU 203 of the BLE module 201.

In the example of FIG. 8, the transceiver 204 can process and/or cache advertising packets 301 to allow the CPU 203 of the BLE module 201 to be placed in a low power or sleep mode so that it does not have to be awoken when duplicative advertiser packets are received from a BLE advertiser 101. Accordingly, in step 801, the transceiver 204 can obtain an advertising packet 301 from a BLE advertiser 101. In step 803, the transceiver 204 can determine if an entry corresponding to the advertiser address extracted from the advertising packet is cached in the advertiser cache 421, which can be stored in the memory 206 and/or an internal cache in the transceiver 204. If an entry corresponding to the advertiser address is not cached, then the transceiver 204 can cache an entry corresponding to the CRC checksum and advertiser address in step 809.

If an entry corresponding to the advertiser address extracted from the advertising packet is found, then in step 805 the transceiver can determine whether the error checking field, or CRC checksum, has changed. If it has, then the transceiver can cache the new CRC checksum in step 809. If the error checking field has remain unchanged relative to the cached entry, then in step 807 the transceiver can increment a match counter. The match counter can be configurable by a host application executed by a host processor 202 and/or firmware executed by the CPU 203. A match counter can be set to specify a maximum number of duplicative advertiser packets from a particular BLE advertiser 101 that the transceiver can receive before the transceiver wakes the host processor and/or firmware executed by the CPU or forwards the advertiser packet to the same.

In step 811, the transceiver 204 can determine whether the match counter equals a configurable threshold. If the match counter does not equal such a threshold, then the process can end, which can eliminate the power consumption ramifications associated with reporting the advertiser packet to the firmware executed by the CPU 203 and/or host processor 202. If the match counter equals the threshold, then the transceiver 204 can reset the match counter in step 813 and report the advertiser packet to the firmware executed by the CPU 203 in box 815. From that point, the firmware executed by the CPU 203 can determine whether the duplicative advertising packet received by the transceiver 204 should be forwarded to the host processor 202.

The flowcharts of FIGS. 7-8 show the functionality and operation of a BLE module 201 according to various embodiments of the disclosure. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor. The machine code may be converted from the source code, etc. If embodied in hardware, each block may represent a circuit or a number of interconnected circuits to implement the specified logical function(s).

Although the flowcharts of FIG. 7-8 show a specific order of execution, it is understood that the order of execution may differ from that which is depicted. For example, the order of execution of two or more blocks may be scrambled relative to the order shown. Also, two or more blocks shown in succession in FIGS. 7-8 may be executed concurrently or with partial concurrence. Further, in some embodiments, one or more of the blocks shown in FIG. 7-8 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including any executed in the BLE module 201, that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

There, having thus described the invention, at least the following is claimed:

1. A method comprising:
   obtaining an advertiser packet transmitted by a Bluetooth low energy (BLE) advertiser in a BLE module in a host device;
   determining, in the BLE module, whether an advertiser cache in the BLE module contains an entry associated with an advertiser address from the advertiser packet;
   comparing, in the BLE module, an error checking field extracted from the advertiser packet with a cached error checking field extracted from a previously received advertiser packet associated with the advertiser address;
   when the error checking field equals the cached error checking field:
       incrementing, in the BLE module, a counter corresponding to a number of consecutive advertiser packets received that are associated with the advertiser address and contain the error checking field,
       suppressing, in the BLE module, sending of a scan request packet in response to the advertiser packet,
       suppressing, in the BLE module, forwarding the advertiser packet to a processor of the host device when the counter does not exceed a threshold, and
       forwarding, in the BLE module, the advertiser packet to the processor of the host device when the counter exceeds the threshold; and
   when the error checking field does not equal the cached error checking field:
       issuing, in the BLE module, the scan request packet in response to the advertiser packet,
       replacing, in the BLE module, the cached error checking field with the error checking field extracted from the advertiser packet,
       resetting, in the BLE module, the counter, and
       forwarding, in the BLE module, the advertiser packet to the processor of the host device.

2. The method of claim 1, further comprising caching a pairing of the advertiser address and the error checking field from the advertiser packet in the advertiser cache.

3. The method of claim 2, wherein comparing the error checking field extracted from the advertiser packet with the cached error checking field further comprises:
   extracting the error checking field from the advertiser packet; and
   comparing the error checking field to the entry in the advertiser cache corresponding to the advertiser address.

4. The method of claim 1, further comprising:
   determining whether a scan response packet associated with the BLE advertiser comprises data relevant to an application executed in the host device; and
   issuing the scan request packet when the scan request packet comprises data relevant to the application.

5. The method of claim 1, wherein comparing the error checking field extracted from the advertiser packet with the cached error checking field is implemented in a transceiver associated with the BLE module.

6. The method of claim 1, wherein determining whether the advertiser cache in the BLE module contains the entry associated with the advertiser address from the advertiser packet and comparing the error checking field extracted from the advertiser packet with the cached error checking field are executed in one of a transceiver and firmware executed by a BLE module central processing unit (CPU).

7. A Bluetooth low energy module, comprising:
   a transceiver configured to:
       obtain an advertiser packet transmitted by a Bluetooth low energy (BLE) advertiser;
       determine whether an advertiser cache in the BLE module contains a cached error checking field associated with an advertiser address from the advertiser packet;
       determine whether an extracted error checking field of the advertiser packet has changed relative to the cached error checking field associated with the advertiser address;
       increment a match counter when the extracted error checking field is unchanged, the match counter corresponding to a number of consecutive advertiser packets received that are associated with the advertiser address and comprise the cached error checking field;

forward the advertiser packet to at least one processor executing a firmware when the extracted error checking field is unchanged and the match counter satisfies a threshold; and suppress sending of a scan request packet in response to the advertiser packet when the extracted error checking field of the advertiser packet is unchanged, otherwise issuing the scan request packet in response to the advertiser packet when the extracted error checking field of the advertiser packet is changed.

8. The BLE module of claim 7, wherein the transceiver is further configured to suppress forwarding of the advertiser packet to at least one processor executing firmware when the extracted error checking field of the advertiser packet is unchanged.

9. The BLE module of claim 7, wherein the transceiver is further configured to cache a pairing of the advertiser address and the extracted error checking field from the advertiser packet in the advertiser cache.

10. The BLE module of claim 7, wherein the transceiver is further configured to determine whether the extracted error checking field of the advertiser packet has changed by:
extracting the error checking field from the advertiser packet; and
comparing the extracted error checking field to an entry in the advertiser cache corresponding to the advertiser address.

11. The BLE module of claim 7, wherein the transceiver is configured to:
determine whether a scan response packet associated with the BLE advertiser comprises data relevant to an application executed in a host device of the transceiver; and
issue the scan request packet when the scan request packet comprises data relevant to the application.

12. A non-transitory computer readable medium having a program that, when executed by processing circuitry, causes the processing circuitry to:
obtain an advertiser packet transmitted by a Bluetooth low energy (BLE) advertiser;
determine whether an advertiser cache in a BLE module contains an entry associated with an advertiser address from the advertiser packet;
determine whether a payload value of the advertiser packet has changed relative to a cached payload value of a previous advertiser packet associated with the advertiser address;
suppress sending of a scan request packet in response to the advertiser packet when the payload value of the advertiser packet is unchanged relative to the cached payload value of the previous advertiser packet associated with the advertiser address;
forward the advertiser packet to a processor executing a firmware in response to determining that the advertiser packet is unchanged relative to the cached payload value of the previous advertiser packet associated with the advertiser address and in response to determining that a counter corresponding to a number of consecutive advertiser packets received that are associated with the advertiser address and contain the payload value exceeds a threshold; and reset the counter in response to determining that the payload value of the advertiser packet is changed relative to the cached payload value of the previous advertiser packet associated with the advertiser address.

13. The non-transitory computer readable medium of claim 12, wherein the program further causes the processing circuitry to suppress forwarding of the advertiser packet to the processor executing the firmware in response to determining that the payload value of the advertiser packet is unchanged and the number of consecutive advertiser packets received that are associated with the advertiser address and contain the payload value do not satisfy the threshold.

14. The non-transitory computer readable medium of claim 12, wherein the program further causes the processing circuitry to cache a pairing of the advertiser address and an error checking field from the advertiser packet in the advertiser cache.

15. The non-transitory computer readable medium of claim 14, wherein the program further causes the processing circuitry to determine whether the payload value of the advertiser packet has changed by causing the processing circuitry to:
extract the error checking field from the advertiser packet; and
compare the error checking field to the entry in the advertiser cache corresponding to the advertiser address.

16. The non-transitory computer readable medium of claim 12, wherein the program further causes the processing circuitry to forward the advertiser packet to the processor executing the firmware in response to determining that the advertiser packet is changed relative to the cached payload value of the previous advertiser packet associated with the advertiser address.

17. The non-transitory computer readable medium of claim 12, wherein the program further causes the processing circuitry to issue the scan request packet in response to the advertiser packet in response to determining that the payload value of the advertiser packet is changed relative to the cached payload value of the previous advertiser packet associated with the advertiser address.

18. The BLE module of claim 7, wherein the transceiver is configured to forward the advertiser packet to the at least one processor executing the firmware when the extracted error checking field is changed relative to the cached error checking field associated with the advertiser address.

19. The non-transitory computer readable medium of claim 12, wherein the program further causes the processing circuitry to determine whether a scan response packet associated with the BLE advertiser comprises data relevant to an application executed in a host device and issue the scan request packet in response to determining that the scan request packet comprises data relevant to the application.

20. The non-transitory computer readable medium of claim 15, wherein a transceiver associated with the BLE module comprises the processing circuitry that is configured to compare the error checking field to the entry in the advertiser cache corresponding to the advertiser address.

* * * * *